United States Patent
Lee et al.

(10) Patent No.: US 10,963,927 B2
(45) Date of Patent: Mar. 30, 2021

(54) SYSTEM AND METHOD FOR PROVIDING MESSAGE-BASED ADVERTISEMENT USING LOCK SCREEN

(71) Applicant: Buzzvil Co., Ltd., Seoul (KR)

(72) Inventors: Young Ho Lee, Seoul (KR); Gwan Woo Lee, Seoul (KR)

(73) Assignee: Buzzvil Co., Ltd., Seoul (KR)

( * ) Notice: Subject to any disclaimer, the term of this patent is extended or adjusted under 35 U.S.C. 154(b) by 115 days.

(21) Appl. No.: 16/091,937

(22) PCT Filed: Apr. 15, 2016

(86) PCT No.: PCT/KR2016/003954
§ 371 (c)(1),
(2) Date: Oct. 5, 2018

(87) PCT Pub. No.: WO2017/175904
PCT Pub. Date: Oct. 12, 2017

(65) Prior Publication Data
US 2019/0095962 A1    Mar. 28, 2019

(30) Foreign Application Priority Data
Apr. 8, 2016 (KR) .................. 10-2016-0043556

(51) Int. Cl.
*G06Q 30/02* (2012.01)
*G06F 3/0484* (2013.01)
(Continued)

(52) U.S. Cl.
CPC ....... *G06Q 30/0277* (2013.01); *G06F 3/0484* (2013.01); *G06Q 30/02* (2013.01);
(Continued)

(58) Field of Classification Search
CPC .... G06Q 30/02; G06Q 30/0277; G06Q 50/10; H04W 4/23; H04W 4/12; G06F 3/0484;
(Continued)

(56) References Cited

U.S. PATENT DOCUMENTS 9,137,238 B1 * 9/2015 Jakobsson .............. G06F 21/31
10,165,108 B1 * 12/2018 Douglas ............ G06Q 30/0267
(Continued)

FOREIGN PATENT DOCUMENTS

| JP | 2003-044414 | 2/2003 |
| JP | 2015-520903 | 7/2015 |

(Continued)

OTHER PUBLICATIONS

Anitoy, "URL Link Preview Screen Configuration", http://anitoy.pe.kr/url%eb%a7%81%ed%81%ac-%eb%af%b8%eb%a6%ac%eb%b3%b4%ea%b8%b0-%ed%99%94%eb%a9%b4-%ea%b5%ac%ec%84%bl%ed%95%98%ea%b8%b0/, published on Mar. 21, 2016.
(Continued)

*Primary Examiner* — Thuy N Nguyen
(74) *Attorney, Agent, or Firm* — Heedong Chae; Lucem, PC

(57) ABSTRACT

Provided are a system and a method for providing a message-based application interlocking screen advertisement, which collect advertisement information about an application corresponding to link information linked to an advertisement-related push message received by a user apparatus to generate advertisement contents for a lock screen and then provide the generated advertisement contents to the user apparatus to display the corresponding advertisement contents through the lock screen.

21 Claims, 10 Drawing Sheets

(51) Int. Cl.
  *H04W 4/23* (2018.01)
  *G06Q 50/10* (2012.01)
  *H04W 4/12* (2009.01)
  *H04L 29/08* (2006.01)
  *H04M 1/725* (2021.01)
  *G06F 40/205* (2020.01)
(52) U.S. Cl.
  CPC ............. *G06Q 50/10* (2013.01); *H04L 67/26* (2013.01); *H04M 1/72552* (2013.01); *H04W 4/12* (2013.01); *H04W 4/23* (2018.02); *G06F 40/205* (2020.01); *H04M 1/72577* (2013.01)
(58) Field of Classification Search
  CPC .... G06F 40/25; H04L 67/26; H04M 1/72552; H04M 1/72577
  See application file for complete search history.

(56) References Cited

U.S. PATENT DOCUMENTS

| | | | | |
|---|---|---|---|---|
| 10,402,037 | B1* | 9/2019 | Van Gorkom | G06Q 30/0267 |
| 10,635,371 | B2* | 4/2020 | Hyun | G06F 3/14 |
| 2007/0088801 | A1* | 4/2007 | Levkovitz | H04L 67/20 |
| | | | | 709/217 |
| 2009/0037279 | A1* | 2/2009 | Chockalingam | G06Q 30/0271 |
| | | | | 705/14.1 |
| 2010/0279667 | A1* | 11/2010 | Wehrs | H04L 51/046 |
| | | | | 455/414.1 |
| 2010/0324997 | A1* | 12/2010 | Evans | G06Q 30/0273 |
| | | | | 705/14.69 |
| 2011/0035284 | A1* | 2/2011 | Moshfeghi | G06Q 30/02 |
| | | | | 705/14.58 |
| 2012/0259707 | A1* | 10/2012 | Thielke | G06Q 30/02 |
| | | | | 705/14.64 |
| 2013/0102273 | A1* | 4/2013 | Jung | G06Q 30/0267 |
| | | | | 455/404.2 |
| 2013/0102363 | A1* | 4/2013 | Jung | H04W 8/22 |
| | | | | 455/566 |
| 2013/0231043 | A1* | 9/2013 | Tawfiq Moshtaha | H04W 4/90 |
| | | | | 455/3.01 |
| 2013/0256403 | A1* | 10/2013 | MacKinnon Keith | |
| | | | | G06Q 20/3821 |
| | | | | 235/375 |
| 2014/0019253 | A1* | 1/2014 | Ricasata | G06Q 30/0241 |
| | | | | 705/14.64 |
| 2014/0245234 | A1* | 8/2014 | Lee | G06F 3/0346 |
| | | | | 715/863 |
| 2015/0039440 | A1* | 2/2015 | Doumet | G06Q 30/0267 |
| | | | | 705/14.64 |
| 2015/0126155 | A1* | 5/2015 | Lee | G06F 3/0484 |
| | | | | 455/411 |
| 2015/0148005 | A1* | 5/2015 | Chau | G06Q 30/02 |
| | | | | 455/410 |
| 2016/0006678 | A1* | 1/2016 | Jung | G06F 3/04842 |
| | | | | 726/19 |
| 2016/0300280 | A1* | 10/2016 | Alsina | H04N 21/4788 |
| 2017/0161018 | A1* | 6/2017 | Lemay | G06F 16/9562 |
| 2020/0259943 | A1* | 8/2020 | Agarwal | H04M 1/725 |

FOREIGN PATENT DOCUMENTS

| | | | |
|---|---|---|---|
| KR | 20110054182 A | * | 11/2009 |
| KR | 10-2011-0054182 A | | 5/2011 |
| KR | 10-1122214 B1 | | 6/2011 |
| KR | 20140056314 A | * | 8/2012 |
| KR | 10-2015-0004305 A | | 1/2015 |
| KR | 10-2015-0123748 A | | 11/2015 |

OTHER PUBLICATIONS

Byungchul Kim, "'Get the First Screen of Smart Phones' . . . Popularity of 'Moneymaking Apps'", http://www.mediatoday.co.kr/?mod=new&act=print&idxno=111288, published on Aug. 5, 2013.

* cited by examiner

SYSTEM AND METHOD FOR PROVIDING MESSAGE-BASED ADVERTISEMENT USING LOCK SCREEN

CROSS-REFERENCE TO RELATED APPLICATIONS

This application is based on and claims the benefit of priority to Korean Patent Application No. 10-2016-0043556 filed on Apr. 8, 2016, with the Korean Intellectual Property Office, the disclosure of which is incorporated herein by reference.

FIELD OF THE INVENTION

The present invention relates to a system and a method for providing a message-based advertisement using a lock screen, and more particularly, to a system and a method for providing a message-based advertisement using a lock screen, which collects advertisement information about an advertisement object from a landing page of the advertisement object based on link information linked to an advertisement message received by a user apparatus to generate advertisement contents and provides the advertisement contents to the user apparatus to display the advertisement contents on a lock screen of the user apparatus.

BACKGROUND ART

With the development of a mobile communication technology, as the spread of smart phones becomes more active, various advertisement methods utilizing the smart phones are emerging.

For example, an advertisement server for providing the advertisement links a URL address of the advertisement object to an SMS message to transmit the URL address to a user's smart phone so that the user may access a web page of the advertisement object based on the URL address linked to the SMS message.

Further, the advertisement server generates a push message linked with the URL address for the advertisement object and including unique identification information about an application according to an advertiser's request to transmit the push message to the user's smart phone. Accordingly, when the user accesses the landing page for the advertisement object through the URL address linked with the corresponding push message or selects the push message, an application corresponding to the unique identification information about the application is activated in the user's smart phone so that information on the advertisement object is provided through the corresponding application.

As described above, most of conventional advertisement methods are a method of providing an advertisement by transmitting an SMS or a push-type message to the user, and these conventional advertisement methods have the following problems.

First, since the conventional advertisement method has inconvenience that the user needs to check the entire contents of the message by selecting the corresponding message, most of the users often select and delete the received message without checking the message, and thus there is a problem that an advertisement effect is significantly deteriorated.

In addition, when a message is received on the smart phone of the user, only a part of the message content is displayed on the screen of the user, so that it is difficult for the user to recognize the entire contents at once and also it is difficult to concentrate the attention of the user. Accordingly, even though the message is a message for an interesting object of the user, there is a problem that it is difficult to guide the browsing of the message.

In addition, when the advertiser intends to insert the advertisement contents into the message in order to induce the interest of the user related to the advertisement object, there is an inconvenience that the advertiser asks to directly create separate advertisement contents for each of different advertisement objects and then insert the advertisement contents into the message to transmit the message.

Therefore, by improving the existing problems, the development of an effective advertisement method has been required to induce the purchase of the advertisement object while concentrating the interest of the user by providing the advertisement contents and the advertisement object to be easily checked by the user without inconvenience to check the contents of the advertisement message through a separate input and reduce a load on the advertisers to create the advertisement contents.

PRIOR ART DOCUMENT

Patent Document

Korean Patent Registration No. 10-1122214

DISCLOSURE

Technical Problem

An object of the present invention is to enhance an advertisement effect by receiving, from an application which is configured in a user apparatus, link information related with an advertisement object included in a received message to control a lock screen of the user apparatus, generating advertisement contents to be displayed on a lock screen of the user apparatus based on a landing page of the advertisement object corresponding to the link information, and then providing the advertisement contents to the user apparatus through a lock screen having high attention and a large size, so as to concentrate the interest of the user without generating separate advertisement information of the advertiser.

Another object of the present invention is to improve convenience of a user for advertisement browsing by automatically accessing a landing page related with the advertisement object in the lock screen when the lock screen is released based on the link information included in the advertisement contents displayed on the lock screen of the user apparatus.

Yet another object of the present invention is to reduce a load on the creation of the advertisement contents of the advertiser requesting the advertisement based on the message and enable double advertisement using the lock screen.

Technical Solution

According to an exemplary embodiment of the present invention, there is provided a system for providing a message-based advertisement using a lock screen including a user apparatus and an advertisement service server connected to the user apparatus through a communication network, the system comprising: an application unit installed in the user apparatus configured to parse a message received by the user apparatus, extract link information about an advertisement object included in the message, transmit the extracted link information to the advertisement service server through the communication network, and display lock screen contents received from the advertisement service server in correspondence with the link information on a lock screen; and an advertisement service server configured to generate the lock screen contents from advertisement information of an advertisement object corresponding to the link information received from the user apparatus and transmit the generated lock screen contents to the application unit of the user apparatus.

In one embodiment related to the present invention, the message may be an SMS message or a push message.

In one embodiment related to the present invention, the application unit may transmit the link information included in the message to the advertisement service server only when there is a text matched with predetermined setting information among a plurality of generated texts generated by parsing the message.

In one embodiment related to the present invention, the application unit may transmit the link information included in the message to the advertisement service server only when a domain name or an IP address included in the link information according to the link information is matched with the predetermined setting information.

In one embodiment related to the present invention, the advertisement information may include image information about the advertisement object, product information, price information, discount information, link information about the landing page of the advertisement object.

In one embodiment related to the present invention, the application unit may display the lock screen contents on the lock screen of the user apparatus at the time of receiving the lock screen contents, and access, when a locked state according to the lock screen is released in a predetermined direction according to the user input, a landing page corresponding to the advertisement object according to the link information included in the lock screen contents to display the landing page on the user apparatus.

In one embodiment related to the present invention, the advertisement service server may generate the lock screen contents by applying the advertisement information to a predetermined content format.

In one embodiment related to the present invention, the advertisement service server may set a channel with the user apparatus based on a predetermined identification information of the application unit received with the link information and transmit the lock screen contents through the corresponding channel.

In one embodiment related to the present invention, the application unit may insert the identification information into the lock screen contents to display the inserted identification information on the lock screen.

In one embodiment related to the present invention, the application unit may generate, when predetermined event information is generated in association with the lock screen contents based on the user input through the user apparatus, a reward corresponding to event information and then transmit the reward to the advertisement service server to save the reward in correspondence with the user, and the advertisement service server may provide the reward to be usable in association with the advertisement object.

In one embodiment related to the present invention, the application unit may extract at least one of text and image information included in the message to add the extracted information to the lock screen contents, or access an access address for an advertisement object-related image included in the message to download the advertisement object-related image and then adds the downloaded advertisement object-related image to the lock screen contents.

In one embodiment related to the present invention, the advertisement service server may receive link information or a text including a predetermined keyword from the user apparatus, and collect private information of the user corresponding to the link information or the keyword from an external server corresponding to the link information or the keyword to generate the lock screen contents from the private information.

According to another exemplary embodiment of the present invention, there is provided a method for providing a message-based advertisement using a lock screen comprising: a link transmission step of parsing, by an application unit installed in a user apparatus, a message received by the user apparatus, extracting link information about an advertisement object included in the message and transmitting the extracted link information to the advertisement service server through a communication network; a contents generation step of generating, by the advertisement service server, lock screen contents based on an advertisement information of the advertisement object corresponding to the link information received from the user apparatus; a contents transmitting step of transmitting, by the advertisement service server, the lock screen contents to the application unit of the user apparatus through the communication network; and a displaying step of displaying, by the application unit, the lock screen contents received from the advertisement service server on a lock screen of the user apparatus.

In one embodiment related to the present invention, the message may be an SMS message or a push message.

In one embodiment related to the present invention, in the link transmission step, the application unit may transmit the link information included in the message to the advertisement service server only when there is a text matched with predetermined setting information among a plurality of generated texts generated by parsing the message.

In one embodiment related to the present invention, in the link transmission step, the application unit may transmit the link information included in the message to the advertisement service server only when a domain name or an IP address included in the link information according to the link information is matched with the predetermined setting information.

In one embodiment related to the present invention, the advertisement information may include image information about the advertisement object, product information, price information, discount information, link information about the landing page of the advertisement object.

In one embodiment related to the present invention, the displaying step may further include displaying, by the application unit, the lock screen contents on the lock screen of the user apparatus, accessing, when a locked state according to the lock screen is released in a predetermined direction according to the user input, a landing page corresponding to the advertisement object according to the link information included in the lock screen contents, and displaying the landing page on the user apparatus.

In one embodiment related to the present invention, in the contents generation step, the advertisement service server may generate the lock screen contents by applying the advertisement information to the layout according to the predetermined content format in correspondence with the link information received from the user apparatus.

In one embodiment related to the present invention, in the contents transmission step, the advertisement service server may set a channel with the user apparatus based on a predetermined identification information predetermined of the application unit received with the link information and transmit the lock screen contents through the corresponding channel.

In one embodiment related to the present invention, in the display step, the application unit may insert the identification information into the lock screen contents and display the inserted identification information on the lock screen.

In one embodiment related to the present invention, the method may further include after the displaying step, generating, by the application unit, when predetermined event information is generated in association with the lock screen contents based on the user input through the user apparatus, a reward corresponding to event information, transmitting the reward to the advertisement service server to save the reward in correspondence with the user; and providing, by the advertisement service server, the reward to be usable in association with the advertisement object.

Advantageous Effects

According to the present invention, the advertisement message is transmitted to the user apparatus, and the advertisement contents are generated based on the landing page of the advertisement object corresponding to the link information extracted by parsing the advertisement message in the user apparatus and then provided to the user apparatus to be displayed on the lock screen of the user apparatus to be displayed on the lock screen of the user apparatus so that the advertisement contents related with the advertisement object corresponding to the advertisement message is provided to be checked through the lock screen first displayed whenever the user apparatus is activated, thereby greatly improving the advertisement effect while concentrating the interest of the user.

Further, according to the present invention, automatic access to the landing page of the advertisement object corresponding to the advertisement contents linked with lock screen is provided when the lock screen on which the advertisement contents are displayed is released, thereby enhancing the purchase rate of the advertisement object of the user while greatly improving convenience of the user for the purchase of the advertisement object.

According to the present invention, the advertisement contents related with the advertisement object of the advertiser is automatically generated based on the message provided from the advertiser and the landing page for the advertisement object of the advertiser without requesting separate creation for advertisement contents for transmission to the user apparatus to the advertiser asking the advertisement for the advertisement object to be displayed on the lock screen of the user apparatus, thereby greatly enhancing convenience of advertisement while reducing a load of the advertiser for the advertisement production.

MODES OF THE INVENTION

Hereinafter, detailed embodiments of the present invention will be described with reference to the drawings.

Figure 1:
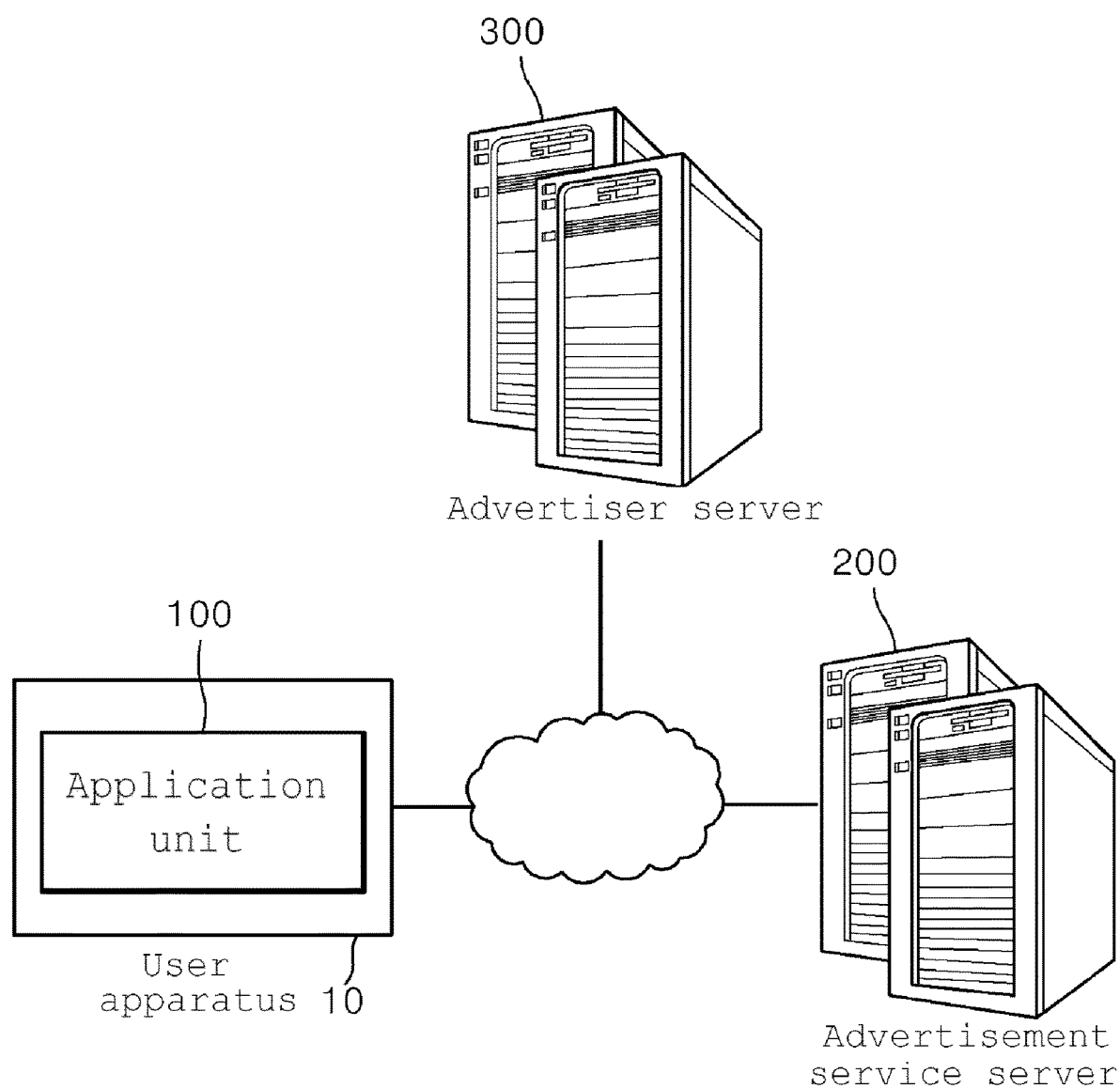
FIG. 1 is a configuration environmental diagram of a system for providing a message-based advertisement using a lock screen according to an embodiment of the present invention.

FIG. 1 is a configuration environmental diagram of a system for providing a message-based advertisement using a lock screen according to an embodiment of the present invention. As shown in FIG. 1, the system may include a user apparatus 10 including an application unit 100 which is configured in the user apparatus 10 to display advertisement contents on a lock screen of the user apparatus 10 and an advertisement service server 200 generating and providing advertisement contents to be displayed on the lock screen of the user apparatus 10 to the application unit 100 of the user apparatus 10 through a communication network.

In addition, when the application unit 100 unlocks the lock screen according to a user input by the user apparatus 10, the application unit 100 may access an advertiser server 300 providing an advertisement object through the communication network according to link information included in the advertisement contents to access a landing page, which is a web page of the advertisement object corresponding to the advertisement contents.

At this time, the advertisement service server 200 may provide the landing page, and the advertiser server 300 may include various servers such as a shopping mall server for selling goods, a game service server for providing games and items used in the corresponding games, or an app store server for providing various applications.

Also, the user apparatus 10 may include a smart phone, a mobile communication terminal, and the like, which provide various communication methods.

In addition, the communication network may be applied with various well-known wired and wireless communication methods, and the application unit 100 maybe referred to as an application which is operated based on an operating system executed by a control unit of the user apparatus 10 and installed in the user apparatus 10.

In the above-described configuration, the advertiser server transmits an advertisement-related message for the advertisement object to the user apparatus 10, and the application unit 100 of the user apparatus 10 extracts link information by parsing the message, transmits the extracted link information to the advertisement service server 200 through the communication network to receive the advertisement contents corresponding to the link information from the advertisement service server 200, and then displays the corresponding advertisement contents on the lock screen to display the advertisement contents through the lock screen whenever the user apparatus 10 is activated, thereby concentrating the interest of the user and enhancing advertisement efficiency. A detailed configuration thereof will be described in detail with reference to the drawings.

Figure 2:
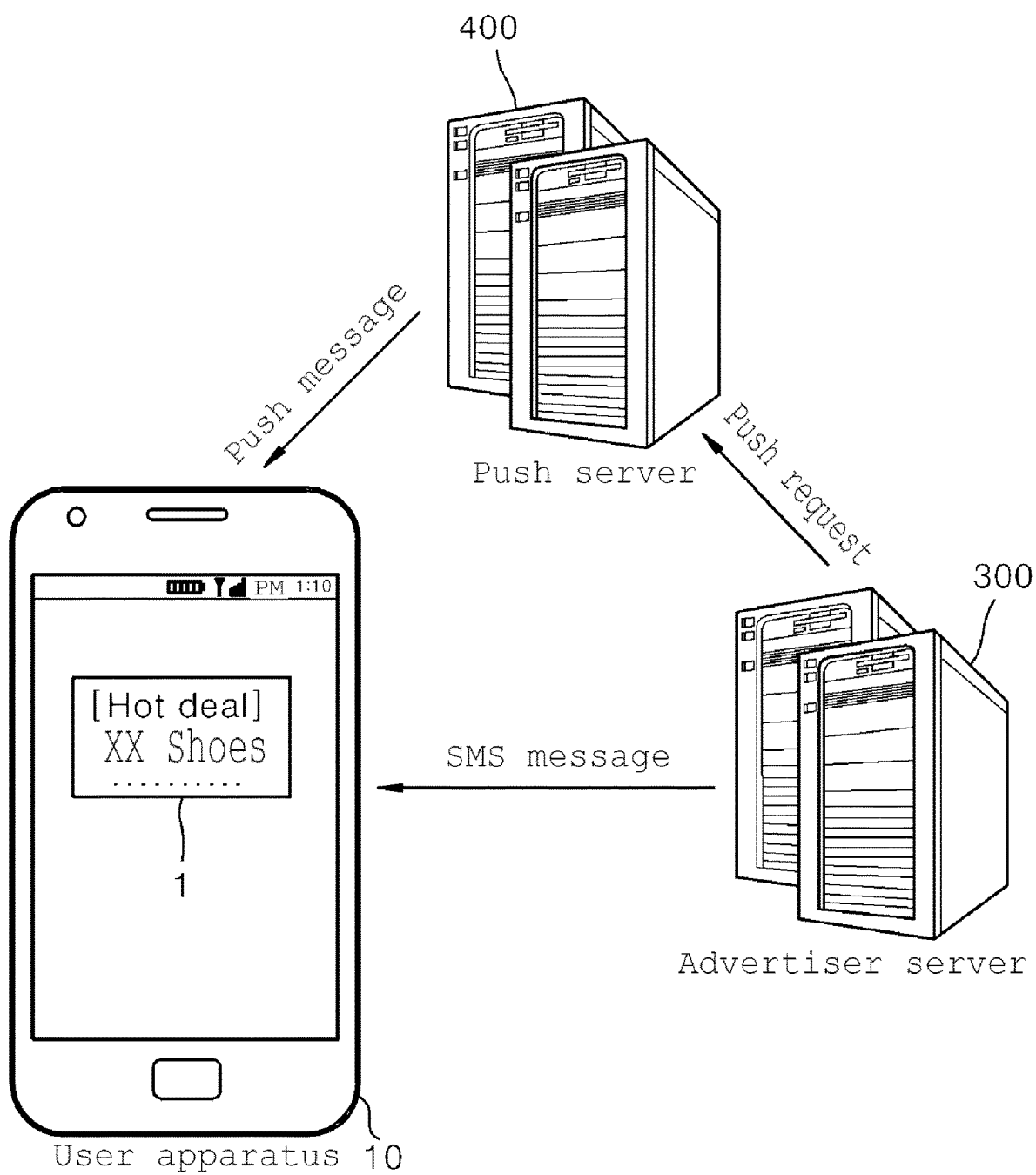
FIG. 2 is an operational exemplary diagram for a message transmitting process of the system for providing the message-based advertisement using the lock screen according to the embodiment of the present invention.

First, FIG. 2 is a diagram for a message transmitting process of the advertiser server providing an advertisement based on the message, and as shown in FIG. 2, the advertiser server 300 may transmit an advertisement message 1 to the user apparatus 10.

At this time, the advertiser server 300 may transmit the advertisement message 1 as a short message service (SMS) message to the user apparatus 10 corresponding to identification information (alternatively, member information) of the user apparatus 10 registered in advance or transmit the advertisement message 1 as a push message through a push server 400 connected through the communication network.

The push server 400 may be included in the advertiser server 300 and may transmit the push message from the advertiser server 300 to the user apparatus 10.

In addition, the advertiser server 300 may include (link) link information including an access address for the advertisement object corresponding to the advertisement message 1 in the advertisement message 1 to transmit the link information to the user apparatus 10. At this time, the access address may be a uniform resource locator (URL) address.

Figure 3:
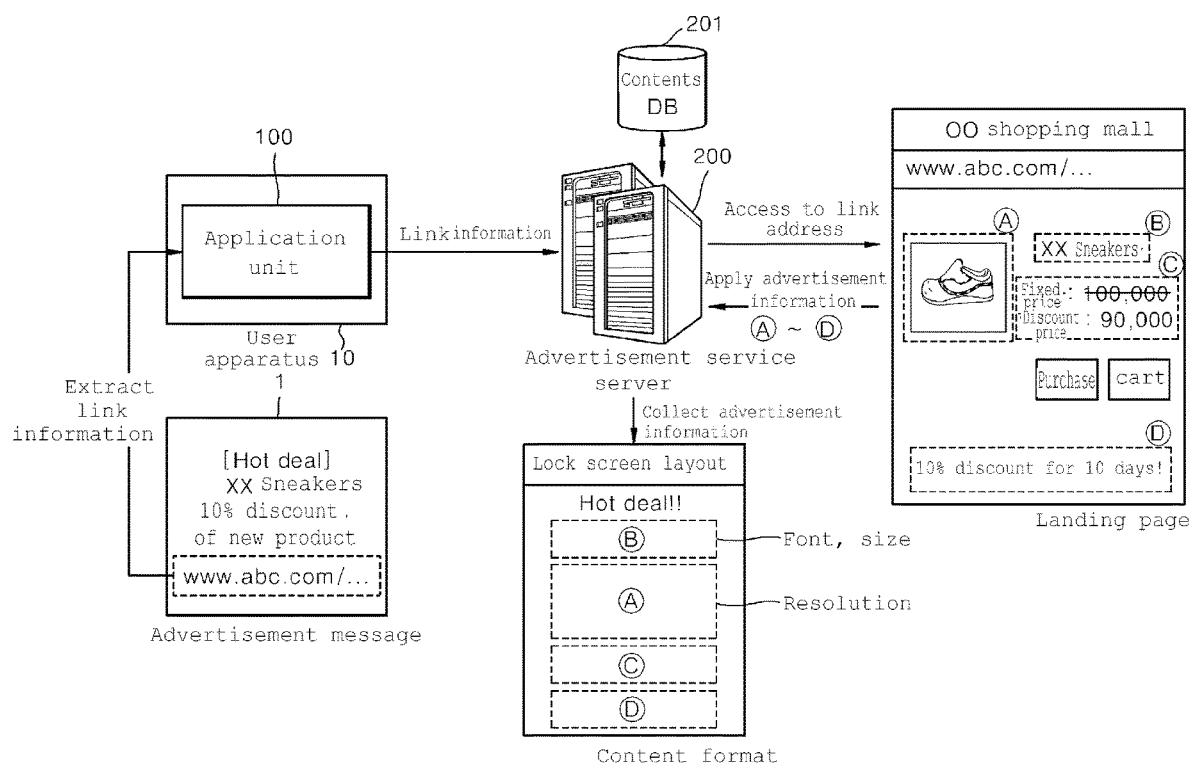
FIGS. 3 and 4 are operational exemplary diagrams for processes of generating advertisement contents and displaying advertisement contents using a lock screen in the system for providing the message-based advertisement using the lock screen according to the embodiment of the present invention.

FIG. 3 is an operational exemplary diagram for a process of providing lock screen-related contents based on the message provided from the advertiser server in the system for providing the message-based advertisement using the lock screen according to the embodiment of the present invention. As shown in FIG. 3, the application unit 100 of the user apparatus 10 may determine whether the link information is present in the content of the advertisement message 1 by parsing the advertisement message 1 at the time of receiving the advertisement message 1 from the advertiser server 300 through the user apparatus 10 and may extract the corresponding link information from the advertisement message 1 when the link information is present and then transmit the extracted link information to the advertisement service server 200.

At this time, the application unit 100 may transmit the link information included in the advertisement message 1 to the advertisement service server 200 only when there is a text matched with predetermined setting information among a plurality of texts generated by parsing the advertisement message 1.

In addition, the application unit 100 may transmit the link information included in the message to the advertisement service server 200 only when a domain name or an internet protocol (IP) address included in the access address according to the link information is matched with the predetermined setting information.

As a result, the application unit 100 is configured to extract the link information only from the advertisement message provided from the advertisement service server 200 and provide the link information to the advertisement service server 200, thereby reducing a load of the advertisement service server 200.

Meanwhile, the advertisement service server 200 may access the landing page, which is a web page of the advertisement object corresponding to the link information when receiving the link information from the user apparatus 10, and collect advertisement information associated with a predetermined content format corresponding to the lock screen according to the locked state of the user apparatus 10 from the corresponding landing page to store the collected advertisement information in a content DB 201.

At this time, the advertisement information may mean information corresponding to one or more different attributes set in advance in the content format, and each attribute may include a data type, metadata, and the like.

For example, the advertisement information may include representative image information about the advertisement object, product information including a product name, price information, discount information, link information about the landing page, and the like. The representative image information may include image data, flash data, or the like as well as image data.

In addition, the advertisement service server 200 collects the advertisement information in advance based on the link information included in the advertisement message 1 transmitted to the user apparatus 10 before receiving the link information and then stores the collected advertisement information in the content DB 201 by matching the advertisement information with the link information.

On the other hand, the advertisement service server 200 may apply the advertisement information to a predetermined content format corresponding to the lock screen according to the locked state of the user apparatus 10 based on the advertisement information collected from the landing page to generate the advertisement contents for the advertisement object.

At this time, the advertisement service server 200 may search the content DB 201 based on the link information received from the user apparatus 10 to extract the advertisement information corresponding to the link information from the content DB 201 and then generate the advertisement contents using the corresponding advertisement information.

In addition, the content format includes set values for a placement area, a size, a font type, and the like for each different metadata, and set values for a placement area, a size, a resolution, and the like of the representative image information, and a layout corresponding to the lock screen of the user apparatus 100 may be set.

Accordingly, the advertisement service server 200 may generate the advertisement contents by adjusting an image of the advertisement object included in the advertisement information to the size and the resolution according to the layout according to the content format to dispose the image in a predetermined region according to the layout or adjusting a text for the product information of the advertisement object according to predetermined font and size according to the layout and then disposing the text in the predetermined region according to the layout.

In addition, the advertisement service server 200 may extract link information including an access address for the landing page of the advertisement object from the advertisement information according to the content format and then insert the link information into the advertisement content to transmit the link information to the user apparatus 10.

In the above-described configuration, the application unit 100 of the user apparatus 10 may allocate a communication channel for session connection with the advertisement service server 200 through the user apparatus 10 to transmit the link information through the communication channel and receive the advertisement contents corresponding to the link information.

In addition, the application unit 100 of the user apparatus 10 may transmit a telephone number, IP address, or media access control (MAC) information corresponding to the user apparatus 10, or identification information including at least one of a unique ID and a user's member ID preset in the application unit 100 to the advertisement service server 200 together with the link information.

Accordingly, the advertisement service server 200 may allocate a communication channel for session connection with the application unit 100 of the user apparatus 10 based on the identification information, and then transmit advertisement contents corresponding to the link information to the application unit 100 of the user apparatus 10 through the corresponding communication channel.

Figure 4:
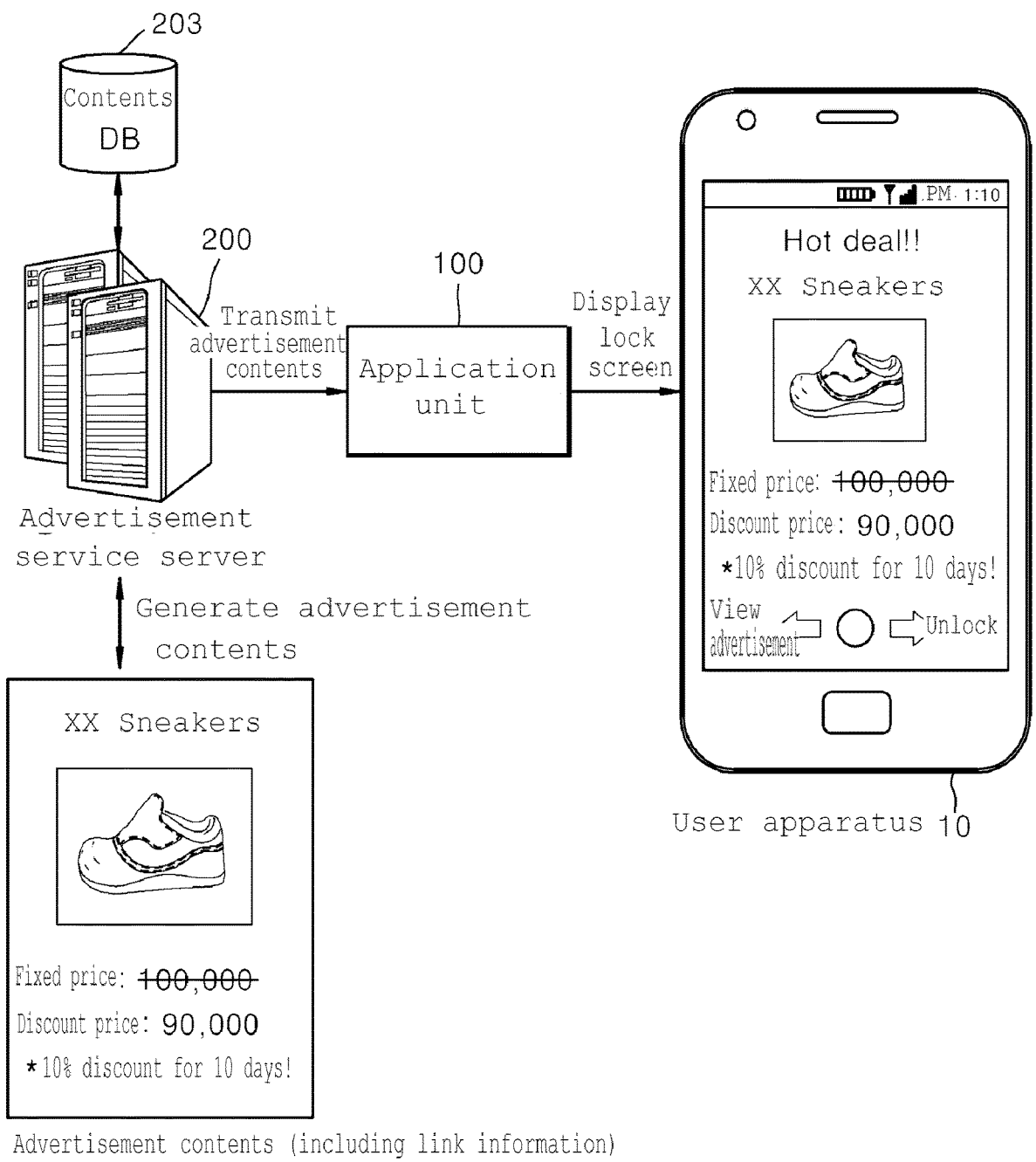

Meanwhile, FIG. 4 is an operational exemplary diagram for a process of displaying the advertisement content on the lock screen in the user apparatus according to the embodiment of the present invention. As shown in FIG. 4, the application unit 100 of the user apparatus 10 may display the advertisement contents received from the advertisement service server 200 on the lock screen according to the locked state of the user apparatus 10.

At this time, when describing the 'lock screen' related to the present invention in detail, in order to prevent the user apparatus 10 from being malfunctioned when an input through a touch screen or an external input button continuously occurs regardless of the intention of the user, the locked state is set. Accordingly, the user apparatus 10 displays the lock screen on a display at the time of initial driving of the user apparatus 10 according to the locked state, and unlocks the lock (locked state) only when the predetermined input corresponding to the release of the locked state is received to use a desired function.

In addition, the application unit 100 according to the present invention is preferably executed in iOS which is an Apple's mobile operating system, Android which is a Google's mobile operating system, and the like, but the present invention is not limited thereto.

Accordingly, the application unit 100 improves a problem that an advertisement effect is significantly deteriorated because the advertisement message is almost deleted or ignored before the advertisement message is browsed by the user to receive the advertisement contents for the lock screen corresponding to the link information included in the advertisement message from the advertisement service server 200 and display the advertisement contents on the lock screen of the user apparatus 10, so that the user may check the advertisement content and the advertisement object through the lock screen whenever the user apparatus 10 is activated. As a result, it is possible to greatly enhance the advertisement effect.

Meanwhile, in the above-described configuration, the application unit 100 may insert identification information including a user's member ID or a user's name corresponding to the user apparatus 10 into the advertisement contents, and display the advertisement contents on the lock screen.

In the above-described configuration, the advertisement service server 200 collects coupon information such as a quick response code (QR code), a bar code, a coupon, and the like from the landing page as the advertisement information and then applies the collected coupon information to the content format to add the coupon information to the advertisement contents.

As a result, the application unit 100 of the user apparatus 10 may display the advertisement contents including the coupon information on the lock screen to provide the coupon information to be used for discounting or intermediate payment of goods.

In addition to the above-described configuration, when the message transmitted to the user apparatus 10 by the advertiser server 300 is a message related with a specific service, such as an alarm message for alarming registration of pictures or images related with the user registered in the advertiser server 300, a user-related dialog message using a messenger provided by the advertiser server 300, or a purchase inducing message of interest goods according to shopping cart information in which the interest goods of the user are registered, the advertiser server 300 may add link information accessible to user-related private information such as photographs, images, shopping cart information, or conversation messages corresponding to the specific service-related message to the message and transmit the added link information to the user apparatus 10.

At this time, as an example of the advertiser server 300 providing the specific service, a social networking service (SNS) server or a shopping mall server may be configured as the advertiser server 300.

Accordingly, the application unit 100 of the user apparatus 10 may extract link information from the message to transmit the extracted link information to the advertisement service server 200, and the advertisement service server 200 may access the advertiser server 300 according to the link information to collect private information related to the message transmitted from the advertiser server 300 and apply the private information to the predetermined content format to generate personal contents for displaying the private information on the lock screen of the user apparatus 10.

For example, the advertisement service server 200 collects various picture data related with the user from the advertiser server 300 according to the link information, and then applies one or more pieces of picture data to the content format by adjusting a resolution, a size, and the like depending on the layout according to the predetermined content format to generate personal contents for displaying on the lock screen of the user apparatus 10.

Meanwhile, the application unit 100 of the user apparatus 10 may receive the personal contents from the advertisement service server 200 to display the received personal contents on the lock screen of the user apparatus 10, so that various information related with the user may be provided through the lock screen.

That is, the present invention maybe provided to generate contents for the lock screen automatically using pictures or images related with the user registered in the server without user's operation or intervention and decorate the lock screen using the corresponding contents while being provided so that the user may conveniently check the latest information related with the user registered in the server.

At this time, the advertiser server 300 maybe configured to provide the private information only to the user identified through user authentication.

Accordingly, the advertisement service server 200 receives authentication information of the user, which can access the private information of the advertiser server 300, from the application unit 100 of the user apparatus 10 and stores the authentication information in the member DB by matching the received authentication information with the identification information stored in the member DB, and extracts the authentication information corresponding to the identification information of the user apparatus 10 from the member DB at the time of accessing the advertiser server 300 according to the link information received from the user apparatus 10 and provides the extracted authentication information to the advertiser server 300 to perform the user authentication, thereby collecting the private information.

In addition, the advertisement service server 200 transmits request information including the link information about collecting private information corresponding to the link information to the advertiser server 300 and requests the private information corresponding to the link information to the advertiser server 300 to collect the private information corresponding to the link information from the advertiser server 300.

Alternatively, the advertiser server 300 may transmit a message including a keyword previously promised with the advertisement service server 200 to the user apparatus 10, and the application unit 100 of the user apparatus 10 may transmit a text including the keyword from the message to the advertisement service server 200.

Accordingly, the advertisement service server 200 identifies a predefined keyword included in the text when receiving the text, and transmits the keyword to the advertiser server 300 previously set in response to the keyword to request private information corresponding to the keyword and may receive the private information corresponding to the keyword from the advertiser server 300 and then apply the private information to the content format to generate the personal contents.

At this time, the advertisement service server 200 may parse the text to generate a plurality of keywords, compare each keyword with a predefined keyword to recognize the advertiser server 300 based on the keyword, and identify a private information-related keyword for receiving the private information related keyword to transmit the private information-related keyword to the advertiser server 300.

In addition, the private information may be information predefined by the advertiser server 300 except for the advertisement.

Meanwhile, the advertisement contents and the personal contents for the lock screen described in the present invention may mean lock screen contents for the lock screen.

In addition to the above-described configuration, the advertiser server 300 adds image information related to an advertisement object, or image link information about an access address in which an image of the advertisement object is stored as well as the text to the advertisement message transmitted to the user apparatus 10 to transmit the added image information or image link information to the user apparatus 10.

Accordingly, when the application unit 100 of the user apparatus 10 transmits the link information included in the advertisement message to the advertisement service server 200 and receives the lock screen contents corresponding to the link information, the application unit 100 extracts at least one of the text and image information included in the advertisement message in the lock screen contents to add the extracted text and image information to the lock screen contents or accesses the access address according to the image link information to download the image of the advertisement object and then add the downloaded image to the lock screen contents.

As a result, according to the present invention, it is possible to provide various detailed information related with the advertisement object through the lock screen by additionally inserting various images included in the advertisement message to the lock screen contents.

Figure 5:
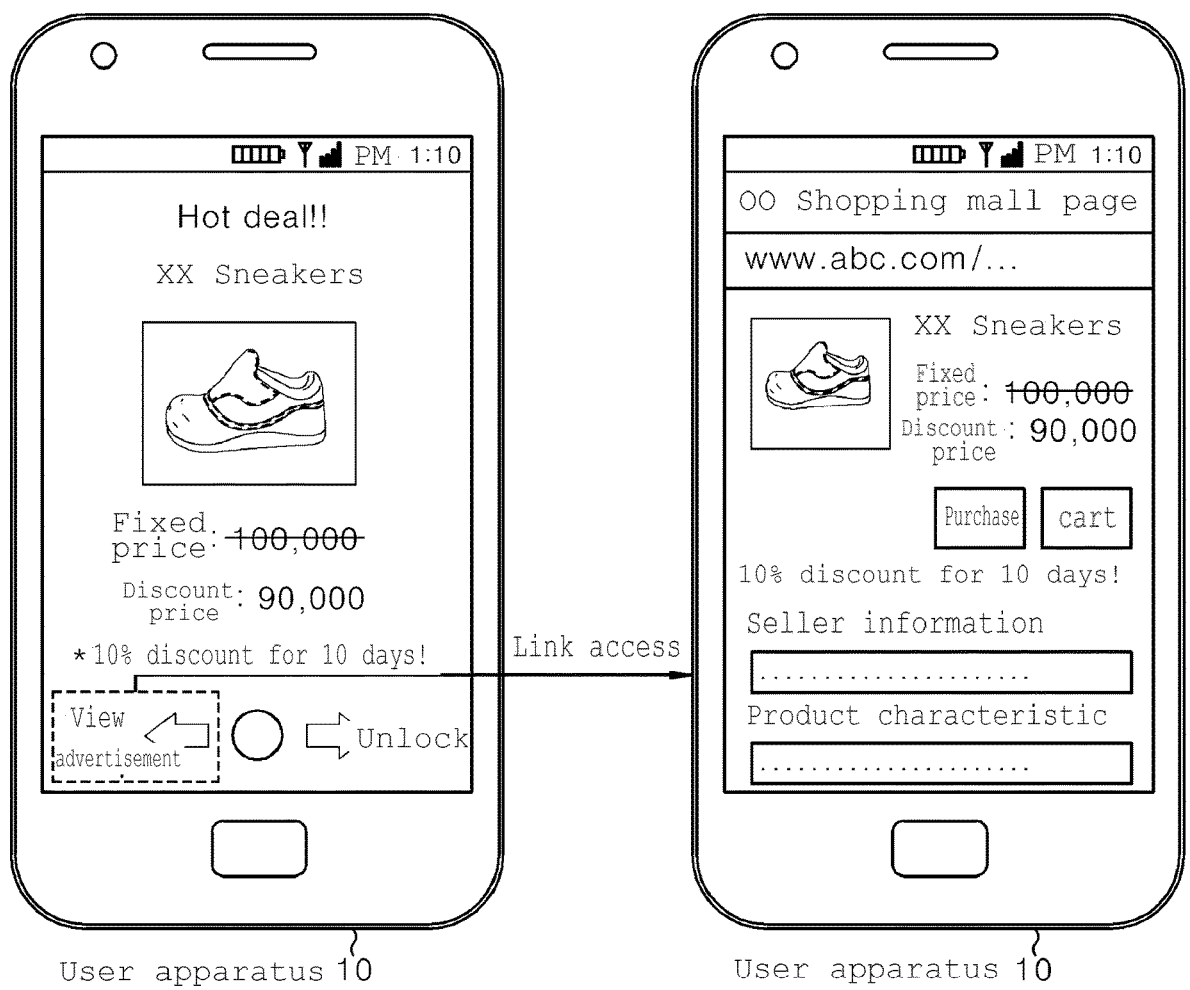
FIG. 5 is an operational exemplary diagram for a process of displaying a landing page through unlocking of a lock screen in which advertisement contents are displayed in a user apparatus according to the embodiment of the present invention.

Meanwhile, FIG. 5 is an operational exemplary diagram for a process of displaying the landing page by unlocking of the lock screen on which the advertisement contents are displayed in the user apparatus according to the embodiment of the present invention. As shown in FIG. 5, the application unit 100 of the user apparatus 10 automatically accesses the landing page according to the link information included in the advertisement contents when the locked state according to the lock screen is released in a predetermined direction based on the user input through the user apparatus 10 in the lock screen to display the landing page on the display of the user apparatus 10.

For example, the application unit 100 may release the lock screen and display an interface for a first input direction for accessing the landing page for the advertisement content and a second input direction for simply releasing the lock screen on the lock screen together with the advertisement contents.

Accordingly, when a swipe, slide or drag input corresponding to the first input direction is received through the interface based on the user input through the user apparatus 10, the application unit 100 may release the lock screen and then access the landing page corresponding to the advertisement contents based on the access address according to the link information included in the advertisement contents to display the corresponding landing page on the screen of the user apparatus 10.

Meanwhile, the application unit 100 releases the locked state according to the lock screen when receiving the user input in the second input direction through the interface on the lock screen in which the advertisement contents are displayed and output a predetermined home screen according to the operating system installed in the user apparatus 10 on the screen of the user apparatus 10.

Through the above-described configuration, the application unit 100 according to the present invention may be provided to immediately access the landing page corresponding to the advertisement contents displayed on the lock screen by simply inputting the release of the lock screen, thereby improving user convenience and inducing not only the simple advertisement but also the purchase of the advertisement object.

Figure 6:
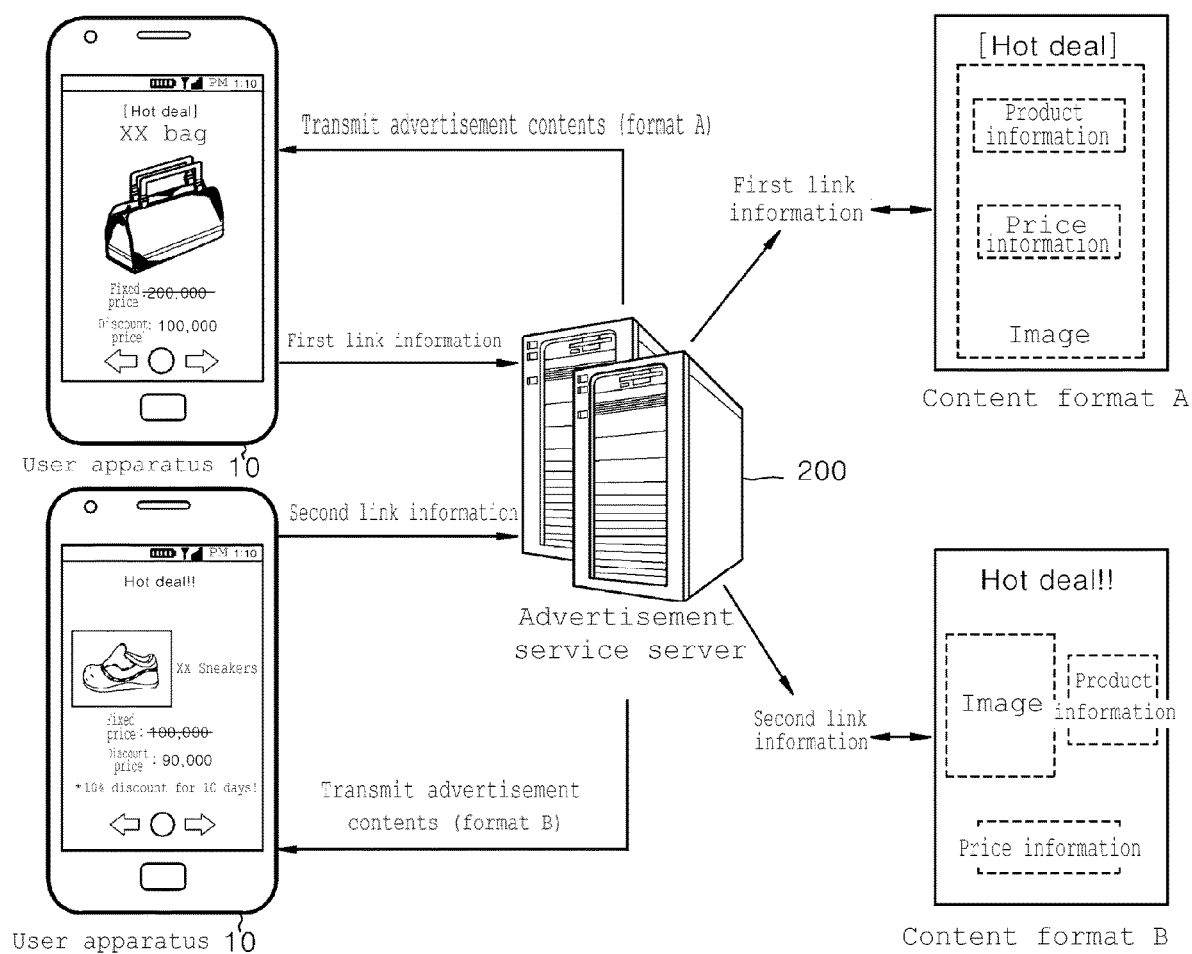
FIG. 6 is an operational exemplary diagram for a process of generating different advertisement contents for different link information of an advertisement service server according to the embodiment of the present invention.

Meanwhile, as shown in FIG. 6, the advertisement service server 200 may set different content formats in correspondence with different advertisement messages, respectively. In this way, the advertisement service server 200 generates an optimal advertisement content applying an optimal content format in correspondence with different advertisement messages to provide the generated optimal advertisement content to the user apparatus 10.

For example, the advertisement service server 200 receives an advertisement message and selection information about a content format selected by the advertiser from among a plurality of content formats from the advertiser server 300, matches the content format selected according to the selection information with the advertisement message, and stores the matched content format in the content DB 201.

Accordingly, the content DB 201 may store different content formats for generating advertisement contents in correspondence with different advertisement messages of different advertisement objects.

In addition, when first link information is received from the application unit 100 of the user apparatus 10, the advertisement service server 200 extracts a content format A stored in correspondence with the advertisement message included in the first link information from the content DB 201, generates a first advertisement content by applying advertisement information collected from the landing page corresponding to the first link information to a layout according to the content format A, and then transmits the generated first advertisement content to the application unit 100 of the user apparatus 10 to display the first advertisement content on the lock screen of the user apparatus 10.

In addition, when second link information is received, the advertisement service server 200 extracts a content format B stored in correspondence with the advertisement message included in the second link information from the content DB 201, generates a second advertisement content having a different content format from the content format of the first advertisement content by applying advertisement information collected from the landing page corresponding to the second link information to a layout according to the content format B, and then transmits the generated second advertisement content to the application unit 100 of the user apparatus 10 to display the second advertisement content on the lock screen of the user apparatus 10.

Through the above-described configuration, the advertisement service server 200 sets and stores an optimal format capable of enhancing the advertisement efficiency for each advertisement object, generates advertisement contents according to the optimal format, and displays the generated advertisement contents on the lock screen of the user apparatus 10, thereby further enhancing the advertisement efficiency.

The application unit 100 of the user apparatus 10 pays a reward when predetermined event information occurs according to the user input through the user apparatus 10 with respect to the advertisement contents displayed on the lock screen of the user apparatus 10 to provide the reward to be used at the time of purchase of the advertisement object corresponding to the advertisement content, and a detailed configuration thereof will be described with reference to FIG. 7.

Figure 7:
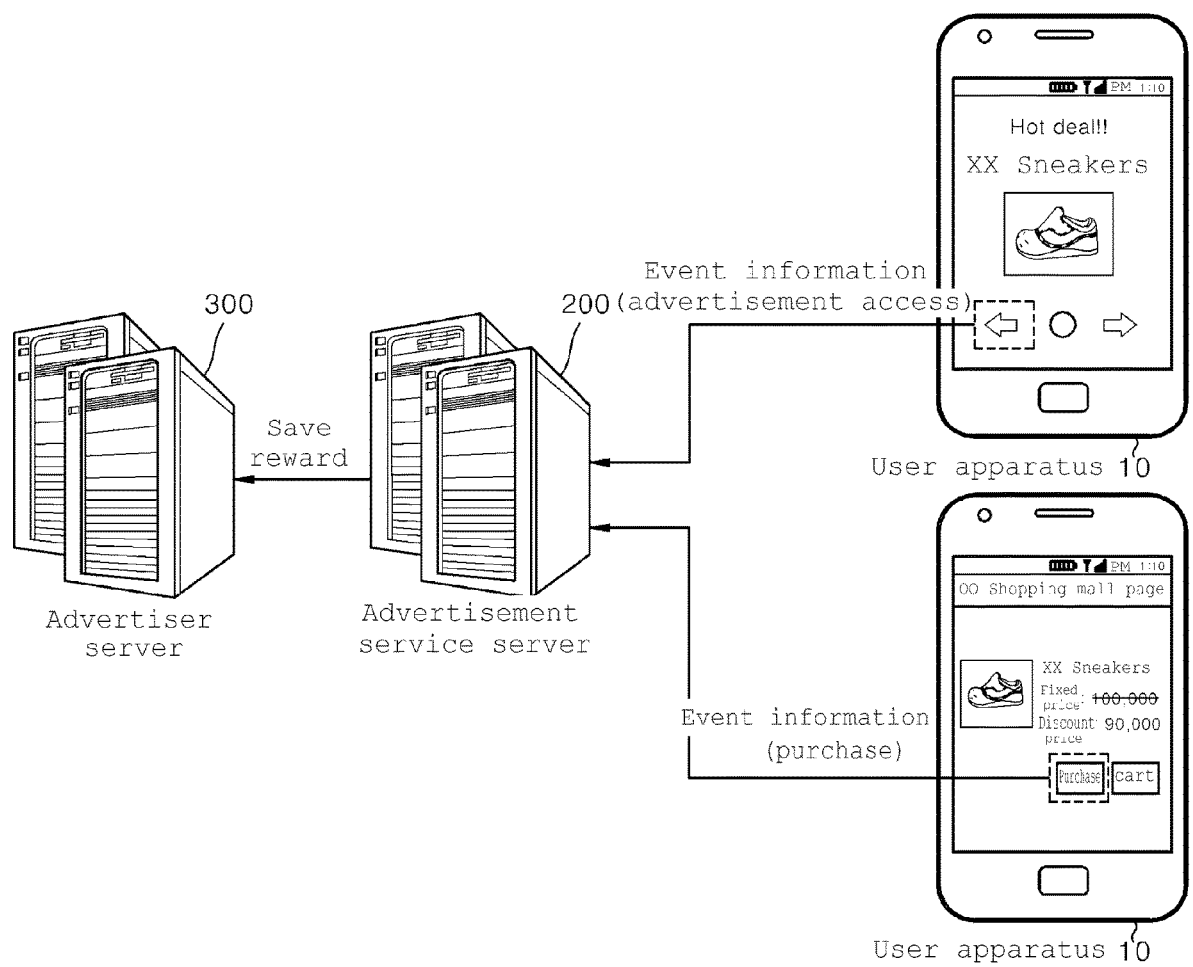
FIG. 7 is an operational exemplary diagram for event information-based reward payment of the advertisement service server according to the embodiment of the present invention.

For example, as shown in FIG. 7, the application unit 100 of the user apparatus 10 may display the advertisement contents on the lock screen, generate event information when an event of accessing the landing page according to the link information included in the advertisement contents occurs according to the user input through the user apparatus 10, and transmit the event information to the advertisement service server 200.

In addition, the application unit 100 of the user apparatus 10 may access the landing page of the advertisement object corresponding to the advertisement content through the link information included in the advertisement contents, generate event information when a purchase input for the corresponding advertisement object occurs, and transmit the generated event information to the advertisement service server 200.

Accordingly, the advertisement service server 200 may compare the event information with a preset reward generation condition 10, generate a reward corresponding to the event information when the event information corresponding to the reward generation condition is received, and then accumulatively save the reward in the member DB by matching the reward with the identification information corresponding to the user apparatus 10.

Also, the advertisement service server 200 may provide reward information about the reward to the advertiser server 300 that sells the advertisement object corresponding to the advertisement contents, and thus provides the reward to be applied to purchase of the advertisement object when the advertisement object is purchased through the advertiser server 300.

At this time, the reward described in the present invention may be a kind of cyber money that is paid to the user in association with the advertisement object.

In addition, the reward generation condition may be set in the application unit 100 of the user apparatus 10, and the application unit 100 compares the reward generation condition with a predetermined reward generation condition when the event information is generated to generate the reward when event information corresponding to the reward generation condition is generated, and transmits reward information about the corresponding reward and identification information corresponding to the user apparatus 10 (alternatively, the user) to the advertisement service server 200, so that the reward according to the corresponding reward information may be accumulatively saved in the member DB in response to the user and may be provided to receive a discount benefit using the reward at the time of purchasing the goods for the advertisement object through the above-described configuration.

As such, according to the present invention, the reward is provided when a predetermined event such as accessing the landing page of the advertisement corresponding to advertisement contents displayed on the lock screen or purchasing a product occurs, to be supported to receive the discount benefit at the time of the product purchase, thereby improving the advertisement efficiency by inducing the active purchase of the user.

Figure 8:
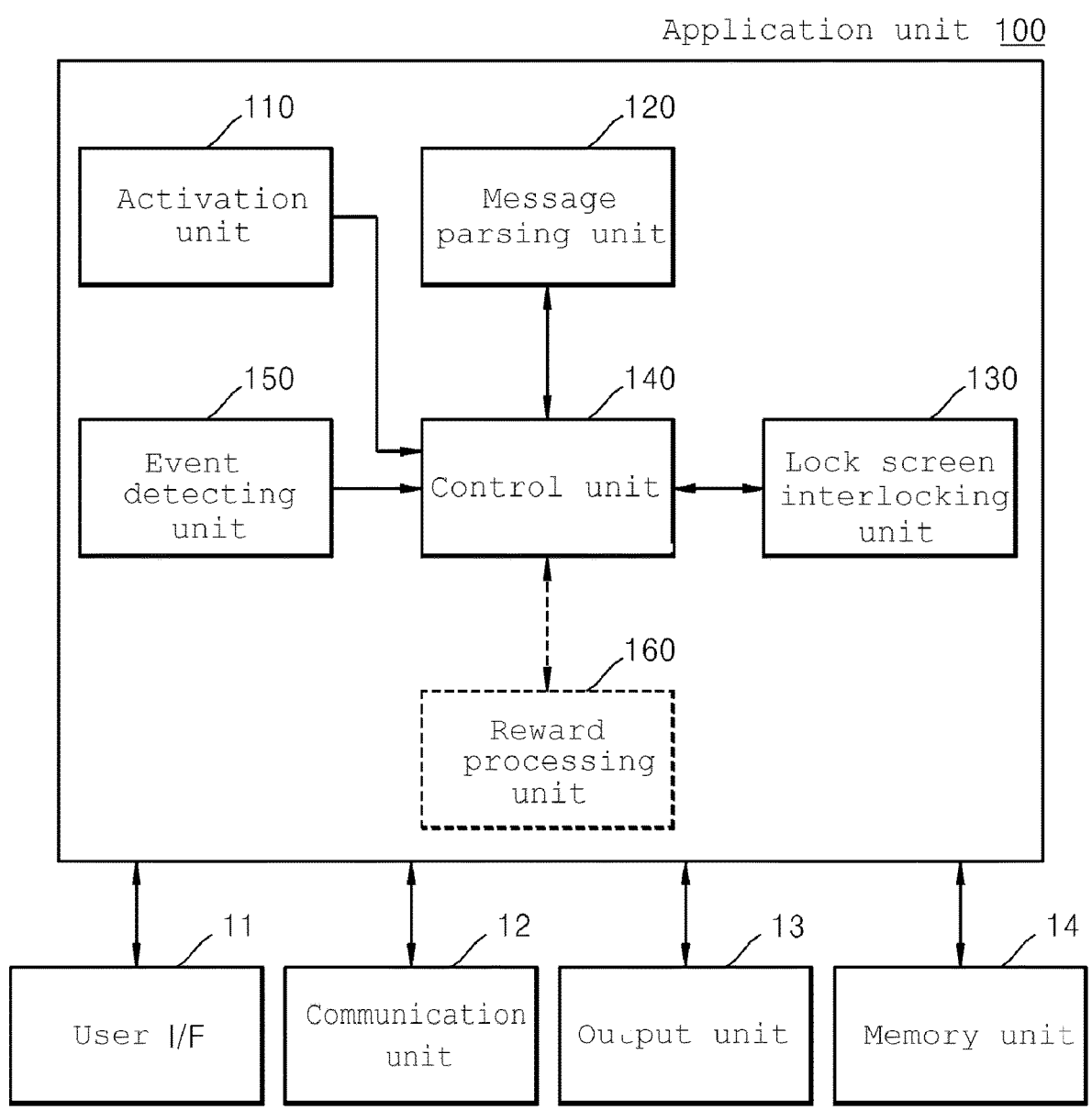
FIG. 8 is a detailed configuration diagram of an application unit configured in the user apparatus according to the embodiment of the present invention.

FIG. 8 is a detailed configuration diagram of the application unit 100 according to the embodiment of the present invention, and as shown in FIG. 8, the application unit 100 may include an activation unit 110, a message parsing unit 120, an event detecting unit 150, a lock screen interlocking unit 130, and a control unit 140.

The activation unit 110 may receive a user input through the user interface unit 11 configured in the user apparatus 10 and receive selection information about activation or deactivation of the application unit 100, and may provide the selection information to the control unit 140.

The control unit 140 activates each component configured in the application unit 100 when the application unit 100 is activated according to the selection information and the control unit 140 may provide the advertisement related message at the time of receiving to the message parsing unit 120 through the communication unit 12 configured in the user apparatus 10.

Accordingly, the message parsing unit 120 may parse the message provided from the control unit 140, extract the link information included in the message, and then provide the extracted information to the control unit 140.

The control unit 140 may transmit the link information to the advertisement service server 200 through the communication unit 12 of the user apparatus 10.

Thereafter, when the advertisement contents corresponding to the link information are received through the communication unit 12, the control unit 140 may provide the advertisement contents to the lock screen interlocking unit 130, and may store the corresponding advertisement contents in the memory unit 14 configured in the user apparatus 10.

Meanwhile, the lock screen interlocking unit 130 detects a locked state of the user apparatus 10 and outputs the advertisement contents to the lock screen according to the locked state through the output unit 13 configured in the user apparatus 10.

In the above-described configuration, when an advertisement message different from the existing message is received in the user apparatus 10, the control unit 140 may display on the lock screen a different advertisement content received in correspondence with the different advertisement message from the advertisement service server 200 by replacing the existing advertisement contents.

The control unit 140 may alternately display a plurality of different advertisement contents stored in the memory unit 14 on the lock screen at predetermined intervals.

Accordingly, the application unit 100 may change the advertisement contents displayed on the lock screen at all time whenever a new message is received to provide various advertisement contents through the lock screen of the user apparatus 10.

Meanwhile, the event detecting unit 150 analyzes log information generated according to a user input through the user interface unit 11 by interlocking with the control unit 140 and generates event information when a predetermined event occurs based on the log information to provide the generated event information to the control unit 140.

The control unit 140 transmits the event information and the predetermined identification information to the advertisement service server 200 through the communication unit 12 so that the reward according to the event information is generated in the advertisement service server 200 in correspondence with the user of the user apparatus 10.

At this time, the application unit 100 may further include a reward processing unit 160, the control unit 140 provides the event information to the reward processing unit 160, and the reward processing unit 160 may compare the event information with a predetermined reward generation condition to generate reward information corresponding to the event information when the event information is matched with the predetermined reward generation condition and provide the generated reward information to the control unit 140.

As a result, the control unit 140 transmits the reward information and the identification information to the advertisement service server 200 through the communication unit 12 so that the reward may be saved in correspondence with the user of the user apparatus 10.

Figure 9:
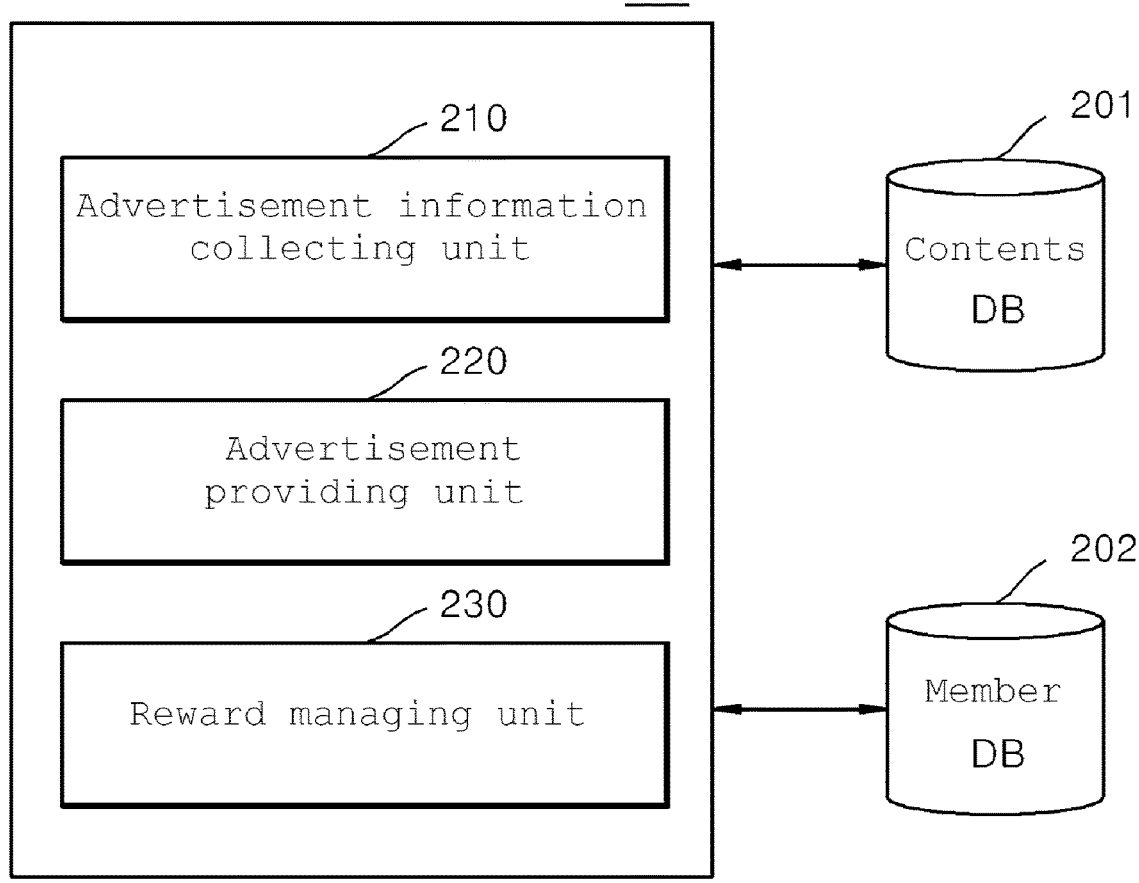
FIG. 9 is a detailed configuration diagram of the advertisement service server according to the embodiment of the present invention.

Meanwhile, FIG. 9 is a detailed configuration diagram of the advertisement service server 200 according to the embodiment of the present invention, and as shown in FIG. 9, the advertisement service server 200 may include an advertisement information collecting unit 210, an advertisement providing unit 220 and a reward managing unit 230.

The advertisement information collecting unit 210 accesses the landing page in accordance with the link information received from the user apparatus 10 in response to the advertisement message received by the user apparatus 10 and collects advertisement information from the landing page to provide the collected advertisement information to the advertisement providing unit 220.

At this time, the advertisement information collecting unit 210 may store the advertisement information in the content DB 201 by matching the advertisement information with the link information.

Meanwhile, the advertisement providing unit 220 applies advertisement information provided from the advertisement information collecting unit 210 to a layout according to a predetermined content format to generate advertisement contents displayed on the lock screen of the user apparatus 10 and transmit the generated advertisement contents to the user apparatus 10.

In addition, the reward managing unit 230 may generate a reward based on the event information received from the user apparatus 10 and accumulatively save the reward in the member DB 202 by matching the reward with the identification information of the user apparatus 10.

In addition, the reward managing unit 230 may accumulatively save the reward according to the reward information in the member DB 202 by matching the reward with the identification information of the user apparatus 10 at the time of receiving the reward information from the user apparatus 10.

In addition, the reward managing unit 230 may extract reward information about the reward accumulatively saved in correspondence to the user from the member DB 202 and transmit the extracted reward information to the advertiser server 300 selling the advertisement object, thereby providing the reward to be used for the product discount when the user purchases the product.

According to the above-described configuration of the present invention, the advertisement contents related with the advertisement object of the advertiser is automatically generated based on the message provided from the advertiser and the landing page for the advertisement object of the advertiser without requesting separate creation for advertisement contents for transmission to the user apparatus 10 to the advertiser asking the advertisement for the advertisement object to be displayed on the lock screen of the user apparatus 10, thereby greatly enhancing convenience of advertisement while reducing a load of the advertiser for the advertisement production.

Figure 10:
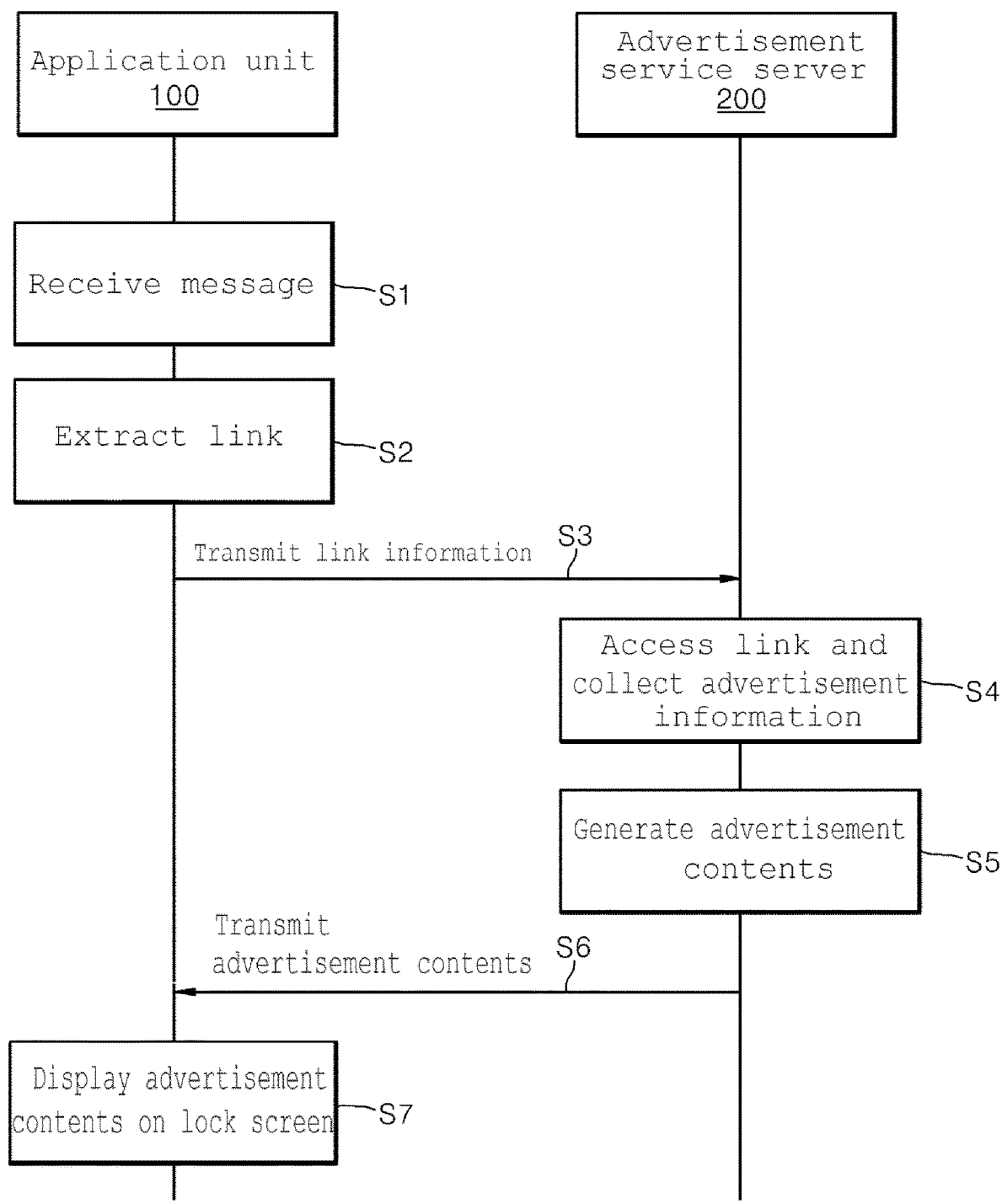
FIG. 10 is a flowchart of a method of providing a message-based advertisement using a lock screen according to another embodiment of the present invention.

FIG. 10 is a flowchart of a method of providing a message-based advertisement using a lock screen according to another embodiment of the present invention.

First, the application unit 100 configured in the user apparatus 10 parses the advertisement message received from the advertiser server 300 to the user apparatus 10 and extracts link information about the advertisement object included in the advertisement message (S1 and S2) to transmit the extracted link information to the advertisement service server 200 through the communication network (S3).

Next, the advertisement service server 200 may access the landing page of the advertisement object based on the link information received from the user apparatus 10, and collect advertisement information associated with a predetermined content format in correspondence with the lock screen according to the locked state of the user apparatus 10 from the corresponding landing page (S4).

Thereafter, the advertisement service server 200 may generate the advertisement contents by applying the advertisement information of the advertisement object corresponding to the link information received from the user apparatus 10 to the content format (S5).

Next, the advertisement service server 200 may transmit the advertisement contents to the application unit 100 of the user apparatus 10 through the communication network (S6), and the application unit 100 of the user apparatus 10 may display the advertisement contents received from the advertisement service server 200 on the lock screen of the user apparatus 10 to provide the advertisement contents on the lock screen of the user apparatus 10 (S7).

Various apparatuses and components described in the present specification may be embodied by a hardware circuit (for example, a CMOS based logic circuit), firmware, software, or combinations thereof. For example, the apparatuses and components maybe embodied by using a transistor, a logic gate, and an electronic circuit in the forms of various electric structures.

Further, each component of the user apparatus may be software stored in the memory of the user apparatus. The memory may be an internal memory of the user apparatus and may an external memory or other types of storage devices. Further, the memory may be a nonvolatile memory. The software stored on the memory may include a command set to allow the user apparatus to perform a specific operation while executing.

As described above, it will be understood to those skilled in the art that the present invention can be corrected and modified without departing from the intrinsic features of the present invention. Therefore, the exemplary embodiments disclosed in the present invention are used to not limit but describe the technical spirit of the present invention and the scope of the technical spirit of the present invention is not limited by the exemplary embodiments. The scope of the present invention should be interpreted by the appended claims and it should be analyzed that all technical spirit in the equivalent range thereto is intended to be embraced by the scope of the present invention.

What is claimed is:

1. A system for providing a message-based advertisement using a lock screen including a user apparatus and an advertisement service server connected to the user apparatus through a communication network, the system comprising:
an application unit installed in the user apparatus configured to:
parse an advertisement message when the advertisement message is received by the user apparatus;
extract link information about an advertisement object included in the advertisement message;
transmit the extracted link information to the advertisement service server through the communication network; and
display lock screen contents received from the advertisement service server in correspondence with the link information on a lock screen; and
an advertisement service server configured to:
collect and store a predetermined content format in a database, the predetermined content format corresponding to an advertisement information associated with the extracted link information about the advertisement object in the advertisement message;
extract the predetermined content format from the database;
generate the lock screen contents corresponding to the lock screen according to a lock state of the user apparatus from the advertisement information by applying the advertisement information to a layout according to the predetermined content format; and
transmit the generated lock screen contents to the application unit of the user apparatus.

2. The system of claim 1, wherein the advertisement message is an SMS message or a push message.

3. The system of claim 1, wherein the application unit is configured to transmit the link information included in the advertisement message to the advertisement service server only when there is a text matched with predetermined setting information among a plurality of generated texts generated by parsing the advertisement message.

4. The system of claim 1, wherein the application unit is configured to transmit the link information included in the advertisement message to the advertisement service server only when a domain name or an IP address included in the link information according to the link information is matched with the predetermined setting information.

5. The system of claim 1, wherein the advertisement information includes image information about the advertisement object, product information, price information, discount information, link information about the landing page of the advertisement object.

6. The system of claim 1, wherein the application unit is configured to:
display the lock screen contents on the lock screen of the user apparatus at the time of receiving the lock screen contents; and access, when the locked state according to the lock screen is released in a predetermined direction according to the user input, a landing page corresponding to the advertisement object according to the link information included in the lock screen contents to display the landing page on the user apparatus.

7. The system of claim 1, wherein the advertisement service server is configured to:
set a channel with the user apparatus based on a predetermined identification information of the application unit received with the link information; and
transmit the lock screen contents through the corresponding channel.

8. The system of claim 7, wherein the application unit is configured to insert the identification information into the lock screen contents to display the inserted identification information on the lock screen.

9. The system of claim 1,
wherein the application unit is configured to:
generate, when predetermined event information is generated in association with the lock screen contents based on the user input through the user apparatus, a reward corresponding to the event information; and
transmit the reward to the advertisement service server to save the reward in correspondence with the user; and
wherein the advertisement service server is configured to provide the reward to be usable in association with the advertisement object.

10. The system of claim 1, wherein the application unit is configured to:
extract at least one of text and image information included in the advertisement message to add the extracted information to the lock screen contents, or access an access address for an advertisement object-related image included in the advertisement message to download the advertisement object-related image; and
add the downloaded advertisement object-related image to the lock screen contents.

11. The system of claim 1, wherein the advertisement service server receives link information or a text including a predetermined keyword from the user apparatus, and collects private information of the user corresponding to the link information or the keyword from an external server corresponding to the link information or the keyword to generate the lock screen contents from the private information.

12. A method for providing a message-based advertisement using a lock screen comprising:
a link transmission step of parsing, by an application unit installed in a user apparatus, an advertisement message received by the user apparatus, extracting link information about an advertisement object included in the advertisement message and transmitting the extracted link information to the advertisement service server through a communication network;
a contents collecting step of collecting, by the advertisement service server, a predetermined content format and storing the predetermined content format in a database, the predetermined content format corresponding to an advertisement information associated with the extracted link information about the advertisement object in the advertisement message;

a contents extracting step of extracting, by the advertisement service server, the predetermined content format from the database;

a contents generation step of generating, by the advertisement service server, lock screen contents corresponding the lock screen according to a lock state of the user apparatus from the advertisement information by applying the advertisement information to a layout according to the predetermined content format;

a contents transmission step of transmitting, by the advertisement service server, the lock screen contents to the application unit of the user apparatus through the communication network; and a displaying step of displaying, by the application unit, the lock screen contents received from the advertisement service server on a lock screen of the user apparatus.

13. The method of claim 12, wherein the advertisement message is an SMS message or a push message.

14. The method of claim 12, wherein in the link transmission step, the application unit is configured to transmit the link information included in the advertisement message to the advertisement service server only when there is a text matched with predetermined setting information among a plurality of texts generated by parsing the advertisement message.

15. The method of claim 12, wherein in the link transmission step, the application unit is configured to transmit the link information included in the advertisement message to the advertisement service server only when a domain name or an IP address included in the link information according to the link information is matched with the predetermined setting information.

16. The method of claim 12, wherein the advertisement information includes image information about the advertisement object, product information, price information, discount information, link information about the landing page of the advertisement object.

17. The method of claim 12, wherein the displaying step further includes:

displaying, by the application unit, the lock screen contents on the lock screen of the user apparatus;

accessing, when a locked state according to the lock screen is released in a predetermined direction according to the user input, a landing page corresponding to the advertisement object according to the link information included in the lock screen contents; and displaying the landing page on the user apparatus.

18. The method of claim 12, wherein in the contents generation step, the advertisement service server is configured to generate the lock screen contents by applying the advertisement information to the layout according to the predetermined content format in correspondence with the link information received from the user apparatus.

19. The method of claim 12, wherein in the contents transmission step, the advertisement service server is configured to:

set a channel with the user apparatus based on a predetermined identification information of the application unit received with the link information; and transmit the lock screen contents through the corresponding channel.

20. The method of claim 19, wherein in the display step, the application unit is configured to:

insert the identification information into the lock screen contents; and display the inserted identification information on the lock screen.

21. The method of claim 12, further comprising:

after the displaying step, generating, by the application unit, when predetermined event information is generated in association with the lock screen contents based on the user input through the user apparatus, a reward corresponding to the event information;

transmitting, by the application unit, the reward to the advertisement service server to save the reward in correspondence with the user; and providing, by the advertisement service server, the reward to be usable in association with the advertisement object.

* * * * *